(12) United States Patent
Harn

(10) Patent No.: US 7,225,116 B2
(45) Date of Patent: May 29, 2007

(54) METHOD FOR ELIMINATING ROUTING CONGESTION IN AN IC LAYOUT

(75) Inventor: Ywh-Pyng Harn, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 695 days.

(21) Appl. No.: 10/225,215

(22) Filed: Aug. 20, 2002

(65) Prior Publication Data

US 2004/0040007 A1 Feb. 26, 2004

(51) Int. Cl.
*G06F 17/50* (2006.01)
*G06F 9/45* (2006.01)

(52) U.S. Cl. .............................. 703/14; 700/97; 716/7; 716/10; 716/12; 716/14

(58) Field of Classification Search .................. 703/14
See application file for complete search history.

(56) References Cited

U.S. PATENT DOCUMENTS

| | | | | |
|---|---|---|---|---|
| 4,908,772 A | * | 3/1990 | Chi | 716/10 |
| 5,222,031 A | * | 6/1993 | Kaida | 716/9 |
| 5,267,176 A | * | 11/1993 | Antreich et al. | 716/10 |
| 5,497,419 A | * | 3/1996 | Hill | 380/200 |
| 5,742,510 A | * | 4/1998 | Rostoker et al. | 700/97 |
| 5,796,625 A | * | 8/1998 | Scepanovic et al. | 716/9 |
| 5,847,965 A | | 12/1998 | Cheng | |
| 5,875,117 A | | 2/1999 | Jones et al. | |
| 6,088,519 A | | 7/2000 | Koford | |
| 6,099,580 A | * | 8/2000 | Boyle et al. | 716/7 |
| 6,186,676 B1 | * | 2/2001 | Andreev et al. | 716/12 |
| 6,292,929 B2 | * | 9/2001 | Scepanovic et al. | 716/14 |
| 6,851,099 B1 | * | 2/2005 | Sarrafzadeh et al. | 716/10 |

OTHER PUBLICATIONS

Sechen, Carl. 'Chip-Planning, Placement, and Global Routing of Macro/Custom Cell Integrated Circuits using Simulated Annealing'. IEEE Computer Society Press 1998: pp. 73-80.*
Hur et al. 'Mongrel: Hybrid Techniques for Standard Cell Placement'. IEEE, 2000.*

* cited by examiner

Primary Examiner—Kamini Shah
Assistant Examiner—Shambhavi Patel
(74) Attorney, Agent, or Firm—Rosenberg, Klein & Lee

(57) ABSTRACT

The invention relates to a method for eliminating routing congestion in an integrated circuit (IC) layout defined by a placement plan indicating a position within the layout of each cell forming the IC and routing plan describing routes followed by nets interconnecting the cells. Routing congestion is eliminated by estimating routing congestion in various areas of the layout and relocating each cell to least routing congested areas of the layout for which cell relocation results in a reduction in the total lengths of the nets connected to the cell that exceeds a predetermined minimum reduction.

36 Claims, 7 Drawing Sheets

METHOD FOR ELIMINATING ROUTING CONGESTION IN AN IC LAYOUT

CROSS-REFERENCE TO RELATED APPLICATIONS

The present application shares common subject matter with Quadratic Programming Method for Eliminating Cell Overlap and Routing Congestion in an IC Layout. U.S. Pat. No. 6,668,365

BACKGROUND OF THE INVENTION

1. Field of the Invention

The present invention relates in general to computer-aided design tools for generating IC layouts and in particular to a method for eliminating routing congestion in an IC layout.

2. Description of Related Art

FIG. 1 illustrates a typical integrated circuit (IC) design process flow. An IC designer usually begins the IC design process by producing a register transfer language (RTL) "netlist" (step 10), a file describing the IC circuit as a set of nets (signal paths) interconnecting terminals of the various circuit devices ("cells") to be included in the IC. A high level RTL netlist may describe cells in terms of the logic they carry out, using Boolean expressions to define logical relationships between device input and output signals. After employing circuit simulation and verification tools (step 11) to check the logic of the IC described by RTL level netlist 10 and modifying the RTL level design when necessary, the designer uses a synthesis tool (step 12) to convert the RTL level netlist into a "gate level" netlist 14 describing each cell by referring to an entry for that cell in a cell library. The cell library includes an entry for each cell that may be incorporated into an IC design. The entry for each cell describes the layout of each cell and also includes a model of cell behavior that simulation and verification tools employ when checking the logic and timing of the circuit described by gate level netlist (step 14). Cells described by cell library may range from very small devices such as individual transistors and small components such as logic gates formed by several transistors, up to very large components such as computer processors and memories.

After verifying the behavior of the circuit described by the gate level netlist at step 14 and modifying the gate level netlist when necessary, the circuit designer employs computer-aided design tools to convert the gate level netlist into an IC layout including a placement plan describing how each cell is to be formed and positioned within a semiconductor substrate and a routing plan describing how the nets interconnecting the cells are to be routed.

To generate an IC layout, the designer may initially create a floor plan (step 16) reserving particular areas of the semiconductor substrate for one or more large cells. The designer then employs a placement and routing (P&R) tool to generate a global placement plan setting an approximate position of each cell (step 17) in a manner consistent with the floor plan wherein highly interconnected cells tend to cluster near one another. This helps to minimize the space occupied by the nets that are to interconnect the cells. If a satisfactory global placement plan cannot be developed, it may be necessary for the designer to revise the floor plan at step 16 and then try again to develop a suitable global placement plan at step 17.

After generating a global placement plan, the P&R tool then converts the global placement plan generated at step 17 into a detailed placement plan (step 18) specifying the exact position and orientation of each cell in a manner consistent with the global placement plan. If the P&R tool cannot develop a detailed placement plan consistent with the global placement plan, it may return to step 17 to develop a new global placement plan.

After developing a satisfactory detailed placement plan at step 18, the P&R tool develops a detailed routing plan (step 20) describing the paths followed by the nets interconnecting cell terminals. The placement and routing steps 18 and 20 are iterative in that when the P&R tool is unable to develop a routing plan at step 20 providing a suitable route for every net of the design, it returns to step 18 to modify the detailed placement plan and then attempts to develop a suitable routing plan for the altered placement plan at step 20.

After developing placement and routing plans at steps 18 and 20, the designer subjects the layout to various analysis, synthesis and optimization procedures (step 22). For example a clock tree synthesis tool may be employed at step 22 to design one or more clock trees for the IC. A clock tree is a network of buffers for distributing a clock signal to the various registers, flip-flops and other clocked circuit devices. The clock tree design produced at step 22 specifies a position for each buffer forming the clock tree and specifies routing paths interconnecting the buffers that will ensure that each clock signal edge arrives all clocked devices at substantially the same time.

Timing analysis tools may also be employed at step 22 to estimate signal path delays and to develop a buffer insertion plan specifying where buffers of various sizes should be placed in nets interconnecting cells to reduce their signal path delays as necessary to keep the path delays within predetermined limits. Other processes implemented at step 22 may check the design to ensure that it satisfies various design criteria.

Whenever any process carried out at step 22 determines that the layout should be modified in some way, for example to incorporate additional buffers, the P&R tool returns to step 18 to incrementally modify the placement plan and then updates the routing plan at step 20. When the layout satisfies all design criteria, a layout level netlist 26 (an updated version of the gate level netlist which includes behavioral models of the nets generated during the layout process) is subjected to simulation and verification (step 28).

Min-Cut Placement Algorithm

A "min-cut" placement algorithm generally similar to the algorithm illustrated in FIG. 2 is typically employed to generate a global placement plan at step 17 of FIG. 1. FIGS. 3–6 illustrate successive stages of the min-cut placement process carried out by the algorithm of FIG. 2.

Referring to FIGS. 2–6, the min-cut algorithm (step 50) initially divides the substrate area 42 in which cells are to be placed into two partitions 44 and 45 and then randomly allocates cells between the two partitions to create a "seed" placement (step 52). The algorithm then carries out a min-cut optimization process (step 54) in which it moves individual cells from either of partitions 44 and 45 to the other partition in an attempt to minimize the number of nets crossing between the partitions. Since there are a large number of ways to allocate cells between the two partitions, the min-cut optimization process typically will not analyze each option, but it will determine for each cell whether moving the cell across the imaginary line between the two partitions will increase or decrease the number of nets cutting across the partition line. When the move increases the number of nets crossing the partition line, the algorithm leaves the cell in its initial partition. Otherwise when the move decreases the number of nets crossing the partition line, the algorithm reassigns the cell to the other partition.

The algorithm may iteratively repeat the placement and optimization steps 52 and 54 N times, starting with a different seed placements for each iteration so that it produces N different optimized placement alternatives, one for each of the N seed placements. After producing the Nth placement (step 56) the algorithm selects the best placement as the placement for which the minimum number of nets cross partitions lines (step 58).

When partitions 44 and 46 are larger than a predetermined minimum size (step 60), the algorithm partitions the layout again (step 50) so that each partition 44 and 46 becomes a "parent" partition that is itself subdivided into two smaller "child" partitions. As illustrated in FIG. 4, parent partition 44 of FIG. 3 has been divided into two children partitions 47 and 48, and parent partition 46 has been divided into children partitions 49 and 50. The P&R tool then (step 52) generates a seed placement, randomly allocating cells of partition 44 between its children partitions 47 and 48 randomly allocating cells of partition 46 between its children partitions 49 and 50 (step 52). The P&R tool thereafter tries to optimize the cell allocation between children partitions 47 and 48 in a manner that will minimize the total number of nets passing between them, and tries to optimize the allocation between children partitions 49 and 50 in a manner that will minimize the total number of nets passing between them (step 54). The seed placement and optimization steps are repeated N times (step 56) to generate N alternative cell placements for partitions 47–50. The particular placement providing for the smaller number of nets crossing partitions lines is selected at step 58.

As illustrated in FIGS. 5 and 6, the algorithm continues to iteratively repeat the partitioning and optimization process (steps 50–60) with children partitions becoming progressively smaller until they reach a predetermined minimum size at step 60. The placement plan at that point becomes the global placement output of the algorithm. The global placement plan specifies only an approximate position of each cell by indicating the partition to which it is assigned. However when subsequently generating the detailed placement plan at step 18 of FIG. 1, the P&R tool specifies an exact position and orientation for each cell within the partition to which it was assigned in the global placement plan.

By seeking to minimize the number of nets crossing partition lines as it allocates cells between partitions, the min-cut algorithm tends to cluster highly interconnect cells near one another. This helps to reduce the space occupied by the nets interconnecting the cells, and therefore helps to reduce the amount of space needed for the nets when the P&R tool subsequently routes the nets at step 20 of FIG. 1.

Routing Congestion

As the P&R tool develops the detailed routing plan at step 20, it may encounter routing congestion problems arising when there is insufficient space in one or more areas of a layout to accommodate all of the nets that the P&R tool wants to route through those areas. The P&R tool can try to reroute nets around a congested area, but in some cases it may find that there is no way to route a net around a congested area without making the net so long that signal path delays within the net become excessive. In such case, it is necessary for the P&R tool to alter the placement plan and then try to develop a satisfactory routing plan for the altered placement plan.

While a conventional min-cut placement algorithm tries to place cells in a manner that helps to reduce the lengths of nets, thereby reducing the likelihood of routing congestion, it does not directly take routing congestion into account when specifying cell positions. Thus it may be necessary for the P&R tool to iteratively generate several different placement plans and attempt to develop a routing plan for each one, until it produces a placement plan for which it can produce a routing plan that is not subject to routing congestion.

What is needed is a method a P&R tool can employ to modify a placement plan so as to reduce the likelihood that routing congestion problems will arise when the P&R tool subsequently tries to develop a routing plan.

BRIEF SUMMARY OF THE INVENTION

The invention relates to placement and routing (P&R) tools for producing an integrated circuit (IC) layouts defined by a placement plan indicating a position within the layout of each cell forming the IC and routing plan describing routes followed by nets interconnecting the cells. The invention relates in particular to method a P&R tool may use to modify a placement plan to reduce routing congestion.

Based on an analysis of the placement and routing plans, a P&R tool employing the method initially searches for a separate "target position" for each cell, such that relocating the cell to its target position would substantially decrease an estimated total amount of space required by the nets connected to that cell.

The P&R tool then selects as a candidate for relocating the cell for which relocation to its target position would provide the largest potential decrease in space consumed by the nets connected to the cell. The P&R tool then establishes a "target area" surrounding the selected cell's target position wherein if the cell were to be relocated to any point within the target area, the resulting reduction in space required by the nets connected to the selected cell would likely be at least as large as a predetermined minimum.

The P&R tool next processes the placement plan to find vacant position within the target area that can accept the selected cell. When more than one vacant position is available, the P&R tool estimates the net routing density in the vicinity of each vacant position, and selects the vacant position in the area having the lowest routing density and then relocates the cell to the selected vacant position.

The P&R tool repeats the process for each cell, thereby attempting to relocate each cell to a vacant position within its target area for which the estimated amount of net routing space saved exceeds the predetermined minimum. As it does so, the P&R tool updates the placement and routing plans to reflect each cell relocation.

Thus the method reduces routing congestion in an IC layout by relocating cells to relatively un-congested areas selected such that each cell relocation substantially reduces the amount of space occupied by the nets connected to the cell.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

The present invention relates to a method that may be practiced by a placement and routing (P&R) tool for eliminating routing congestion within an integrated circuit (IC) layout. While the specification and drawings describe exemplary embodiments and applications of the invention considered to be best modes of practicing the invention, the invention is not limited to the particular exemplary embodiments or applications described below.

Figure 7:
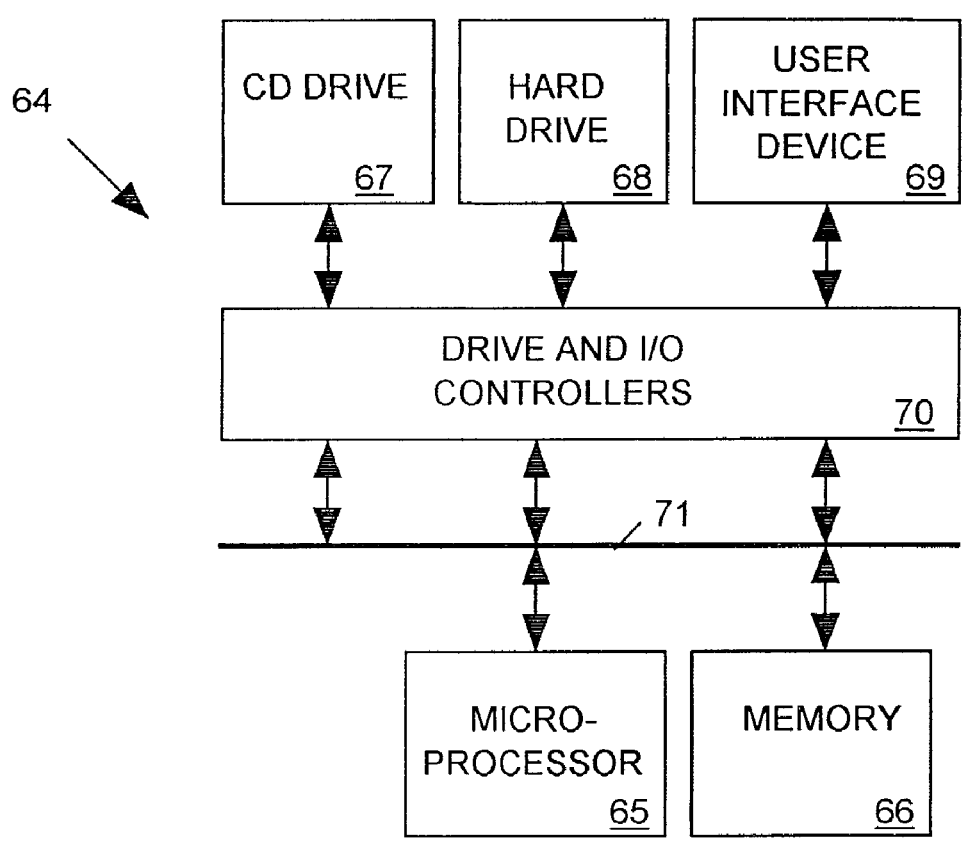
FIG. 7 is a block diagram of a conventional computer that may be programmed to execute a routing congestion reduction algorithm in accordance with the invention.

As illustrated in FIG. 7, a P&R tool employing the method may be implemented by a suitably programmed conventional computer 64 including, for example, a microprocessor 65, memory 66, a compact disk drive 67, a hard disk drive 68, and user interface devices 69 communicating through drive and I/O controllers 70 and a computer bus 71. Computer 64 is programmed to carry out the method by software stored on computer readable media accessed by microprocessor 65 including, for example, a compact disk inserted into CD drive 67, a disc within hard disk drive 68, or a program stored within memory 66. Those skilled in the art will appreciate that other computer architectures may be employed, that the software may be provided on other types of computer readable media, and that computer 64 may access the computer readable media via a computer network, and that the method may be concurrently practiced by more than one computer communicating with one another through network connections.

Routing Congestion

A conventional placement and routing (P&R) tool produces an integrated circuit (IC) layout by generating a detailed placement plan specifying a position and orientation within a semiconductor substrate of cells that are to be incorporated into the IC, and a routing plan indicating how the nets that are to interconnect terminals of the cells are to be routed between cell terminals. A routing congestion problem arises when the P&R tool finds that one or more areas of the layout are unable to accommodate all of the nets that must pass through them. The invention relates to a method a P&R tool can use to eliminate routing congestion by altering the placement plan to relocate cells in a manner that reduces the demand for routing resources within congested areas of the layout.

Routing congestion within any particular area of a layout is related to the density of cells residing in the area. As the density of cells in any area of a layout increases, so too does the density of nets needed to link those cells to one another and to cells outside that area. While conventional min-cut placement algorithms help to reduce the likelihood of routing congestion by trying to minimize the lengths of nets interconnecting the cells, they do not directly take routing congestion into account when specifying cell positions. Thus, for example when a min-cut placement algorithm of FIG. 2 divides a parent partition into two children partitions as discussed above, it might densely populate one child partition and lightly populate the other child partition if it were to find that doing so helps to minimize the number of nets crossing partitions lines. The fact that the densely populated partition might later be subject to routing congestion plays no direct part in how the conventional min-cut algorithm of FIG. 2 places cells. Thus when a P&R tool subsequently attempts to develop a routing plan for a placement produced by a min-cut placement algorithm it can encounter routing congestion problems and may find it necessary to modify the placement plan to relieve those congestion problems.

Placement and Routing Method

Figure 1:
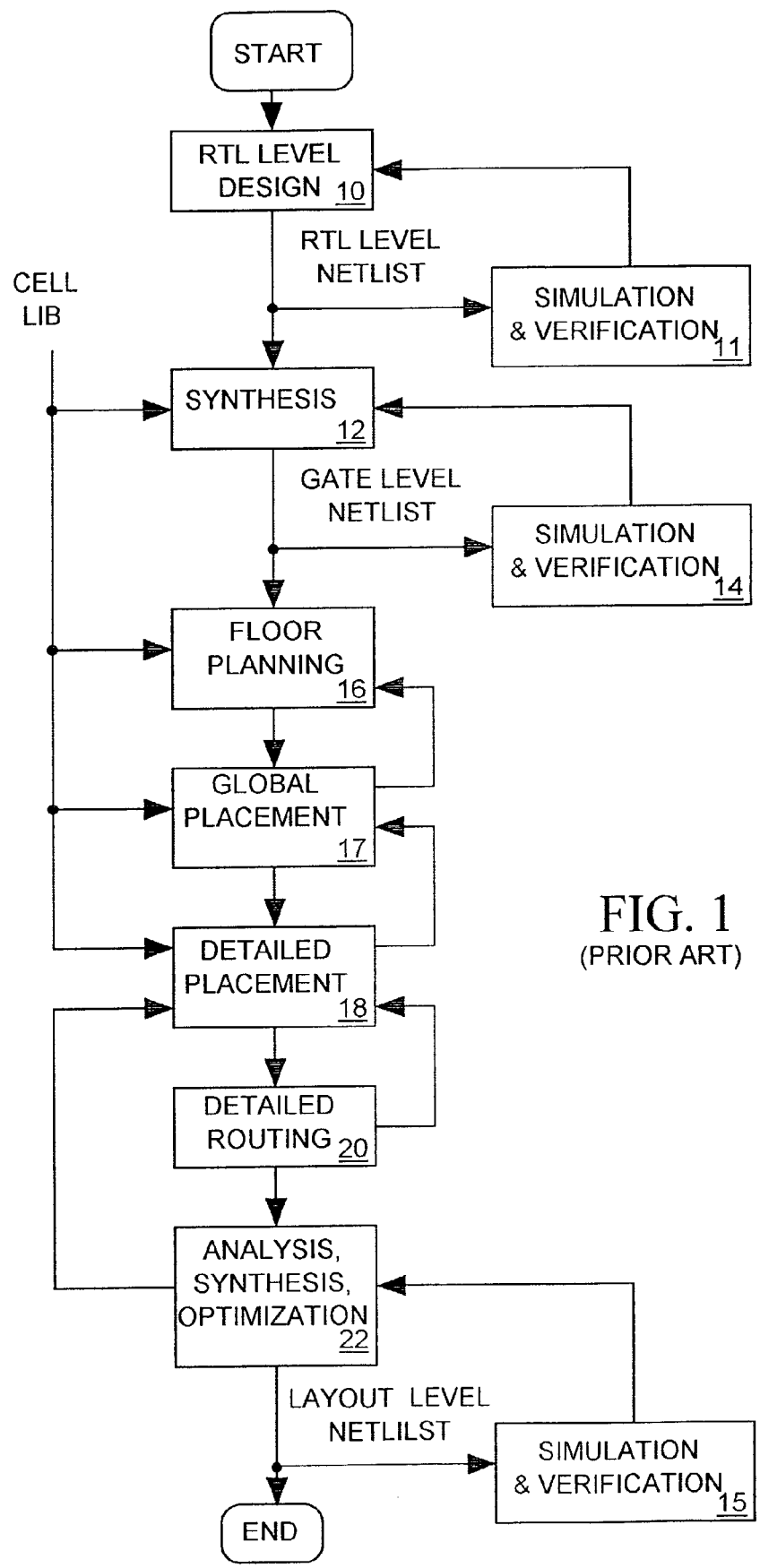
FIG. 1 is a flow chart illustrating a prior art IC design process.
Figure 8:
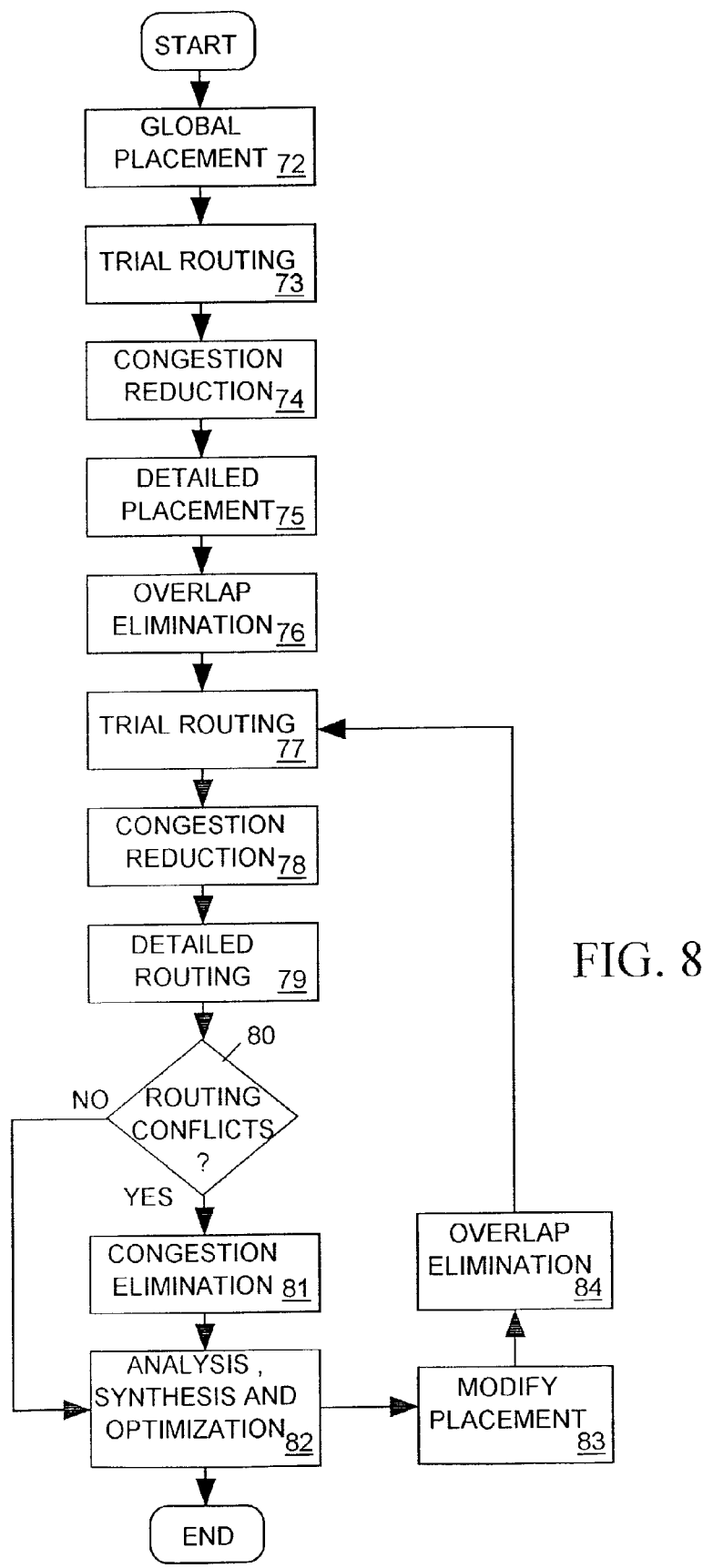
FIG. 8 is flow diagram illustrating a placement and routing process flow in accordance with the invention.

FIG. 8 illustrates a placement and routing method in accordance with the invention which can be used in place of steps 17–22 of the prior art IC design process of FIG. 1. The method reduces the likelihood that routing congestion problems will arise when the P&R tool tries to create a detailed routing plan.

Figure 2:
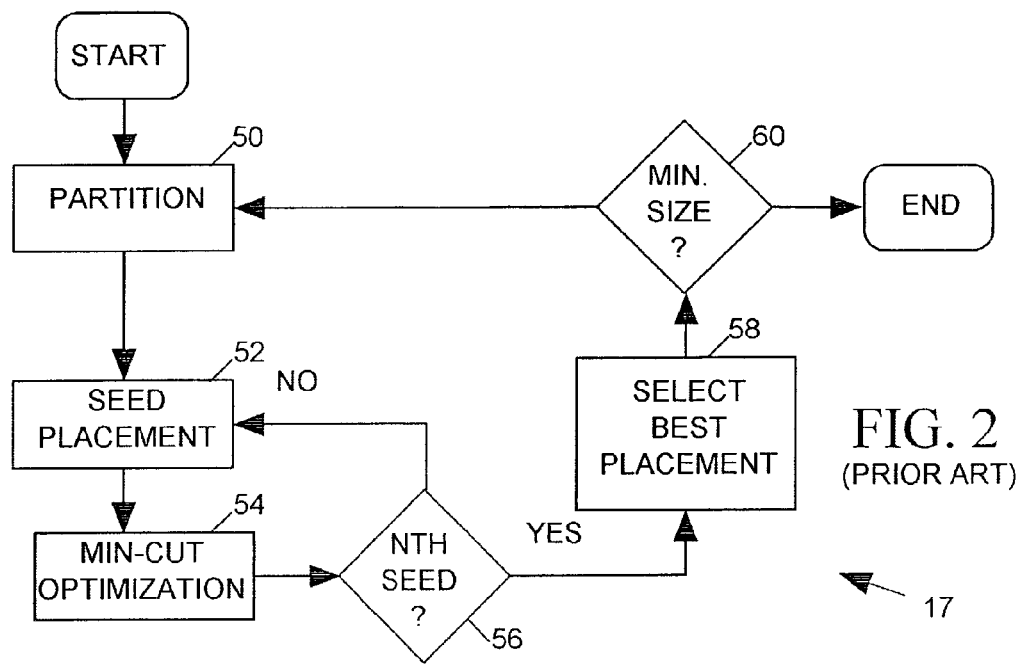
FIG. 2 is a flow chart illustrating a mm-cut algorithm for implementing the global placement step of FIG. 1.
Figure 3:
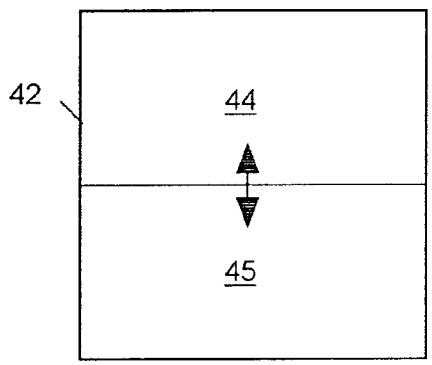
FIGS. 3–6 are diagrammatic views of successive stages of a global placement plan produced by the min-cut algorithm of FIG. 2.
Figure 4:
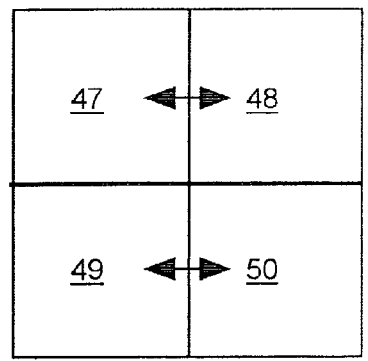
Figure 5:
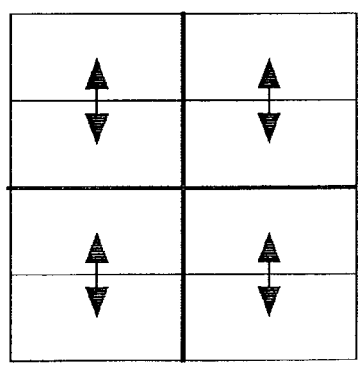
Figure 6:
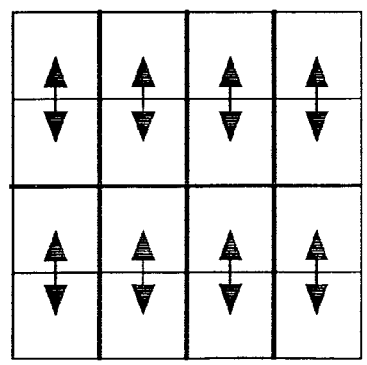

A P&R tool carrying out the method of FIG. 8 may initially employ a conventional placement algorithm similar, for example, to the conventional min-cut algorithm illustrated in FIG. 2 to produce a global placement plan (step 72). As described above, the global placement plan describes the layout as an array of relatively small partitions and specifies which partition is to contain each cell. However the global placement plan does not indicate the particular position or orientation of each cell within the partition to which it is assigned.

After developing the global placement plan at step 72, the P&R tool develops a trial routing plan (step 73) specifying a route each net is to follow between the cells it interconnects. Since the global placement plan does not specify the positions of the cell terminals the nets are to interconnect, the trial routing plan specifies only that each net terminates, for example, at the center or edges of the partitions containing the cells connected to the nets. Although the P&R tool may attempt to produce a trial routing plan that avoids net routing conflicts in which portions of two or more nets occupy the same space, the trial routing plan may permit such routing conflicts when they are unavoidable.

After creating the trial routing plan a step 73, the P&R tool executes a routing congestion reduction algorithm in accordance with the invention (step 74). Based on routing information it obtains from the trial routing plan, the algorithm modifies the global placement plan to reduce the likelihood that the P&R tool will encounter routing congestion when it later develops a detailed routing plan. (The congestion reduction algorithm performed at step 74 is described in more detailed below.)

The P&R tool then generates a detailed placement plan (step 75) specifying the exact position and orientation of each cell within the partition to which it was assigned in the global layout as modified at step 74 by the congestion reduction algorithm. In some cases, the P&R tool may not be able to place each cell within its assigned partition without causing cell overlap. The P&R tool. therefore subjects the detailed placement plan to a cell overlap elimination algorithm (step 76) that modifies the detailed placement plan by moving cells away from areas of high cell density to eliminate cell overlaps. Quadratic Programming Method for Eliminating Cell Overlap and Routing Congestion in an IC Layout, U.S. Pat. No. 6,668,365 describes a suitable overlap elimination algorithm. As described therein, each cell has an area equal in size to an integer number of uniform-size sized "cell units". The overlap elimination algorithm divides the layout into an array of blocks and counts the number of cell units assigned to each block. It then generates a overflow factor for each block based on a comparison of the blocks cell unit capacity and the number of cell units assigned to the block. A positive overflow factor indicates an estimated minimum number of cell units that must be moved out of the block in order to eliminate cell overlap while a negative overflow factor indicates an estimated a maximum number of cell until that may be moved into the block without causing cell overlap. The overlap elimination algorithm then sets up and solves a set of equations relating each block's overflow factor to variables representing flows of cells between that block and its neighboring blocks to determine how to move cell units between neighbor blocks so to eliminate cell overlap.

After modifying the detailed placement plan to eliminate cell overlap at step 76, the P&R tool modifies the trial routing plan so that it is consistent with the detailed placement (step 77). The revised trial routing plan now specifies that each net terminates directly on cell terminals because the P&R tool is able to determine the position of each cell terminal from the detailed placement plan produced at step 75. However the trial routing plan may still include routing conflicts because, while the congestion reduction process carried out at step 74 helps to reduce the likelihood routing conflicts, it does not completely eliminate the possibility of routing conflicts. Therefore, based on information it obtains from the trial routing plan produced at step 77, the P&R tool again employs the congestion reduction algorithm (step 78) to modify the detailed placement plan thereby to further reduce the possibility of routing congestion.

At this point the P&R tool generates a detailed routing plan (step 79) in a conventional manner wherein it tries to resolve all routing conflicts by rerouting nets as necessary. Should the detailed routing plan include any unresolved routing conflicts (step 80), the P&R tool attempts to resolve the conflicts by executing a congestion elimination algorithm at step 81. This algorithm is similar to the overlap reduction algorithm executed at step 76 except that it moves cells units out of each routing congested block and into its neighboring blocks with the number and direction of cell flow being selected so as to reduce routing congestion in the block. The aforementioned Quadratic Programming Method for Eliminating Cell Overlap and Routing Congestion in an IC Layout, U.S. Pat. No. 6,668,365 also describes a suitable congestion elimination algorithm.

The P&R tool then subjects the layout to various conventional procedures (step 82) for analyzing and specifying modifications to the layout so that it meets various constraints. For example a timing analysis tool may be employed at step 82 to estimate time delays through various nets and to determine whether they satisfy various constraints on signal path delays. When a signal path delay within some section of the net is too long, the timing analysis tool may specify that variously sized buffers are to be inserted into those net sections to reduce signal paths delays. This type of timing optimization must be carried out after the detailed routing plan is established so that the signal path delays within the nets can be accurately estimated.

The designer may also employ a clock tree synthesis tool at step 82 to design a clock tree for the IC. A clock tree is a network of buffers for delivering pulses of a clock signal concurrently to various cells such as registers and flip-flops that are to be clocked the clock signal. The clock tree must be designed at step 82 after a detailed placement plan is established because it is necessary to know where the cells receiving the clock signals are positioned.

When any process carried out at step 82 indicates that the detailed placement plan must be modified, for example by inserting buffers at various locations in the layout, the P&R tool modifies the placement plan (step 83) to incorporate the buffers, and then further modifies the plan as necessary (step 84) to eliminate any cell overlap caused by the buffer insertions. Steps 77–81 are then repeated to produce a conflict-free detailed routing plan for the modified placement plan. The analysis, synthesis and optimization procedures are then repeated at step 82 to determine whether the layout meets all constraints. If not, the placement plan is again modified at steps 83 and 84 and a revised detailed routing plan is produced at steps 77–81. The P&R tool iterates through the loop formed by steps 77–84 until it converges on detailed placement and routing plans satisfying all constraints and design criteria.

In the prior art P&R process flow of FIG. 1, a P&R tool resolves routing congestion problems by iteratively modifying the global and detailed placement plans it generates at step 17 and 18 in a somewhat random fashion and then trying to develop an routing plan for each alternative placement plan that is free of routing conflicts. This can be very time-consuming because the P&R tool typically requires lot of processing time to develop a detailed placement plan and to produce a routing plan based on the detailed placement plan.

The use of the routing congestion reduction algorithm at steps 74 and 78 of the process flow in FIG. 8 eliminates the prior art trial and error approach by modifying the global and detailed placement plans produced or modified at steps 72, 75 or 83 as necessary to reduce the likelihood of encountering a routing congestion problem when generating the detailed routing plan at step 79. Even when routing conflicts are detected at step 80, the congestion reduction procedures carried out at steps 74 and 78 usually reduce the severity of the congestion to the point where it can be resolved by the congestion elimination algorithm applied at step 81 with minimum disturbance to the detailed placement and routing plans. This helps to reduce the number of iterations through the loop formed by steps 77–84 the P&R tool must execute in order to converge on an acceptable layout.

Congestion Reduction Algorithm

Figure 9:
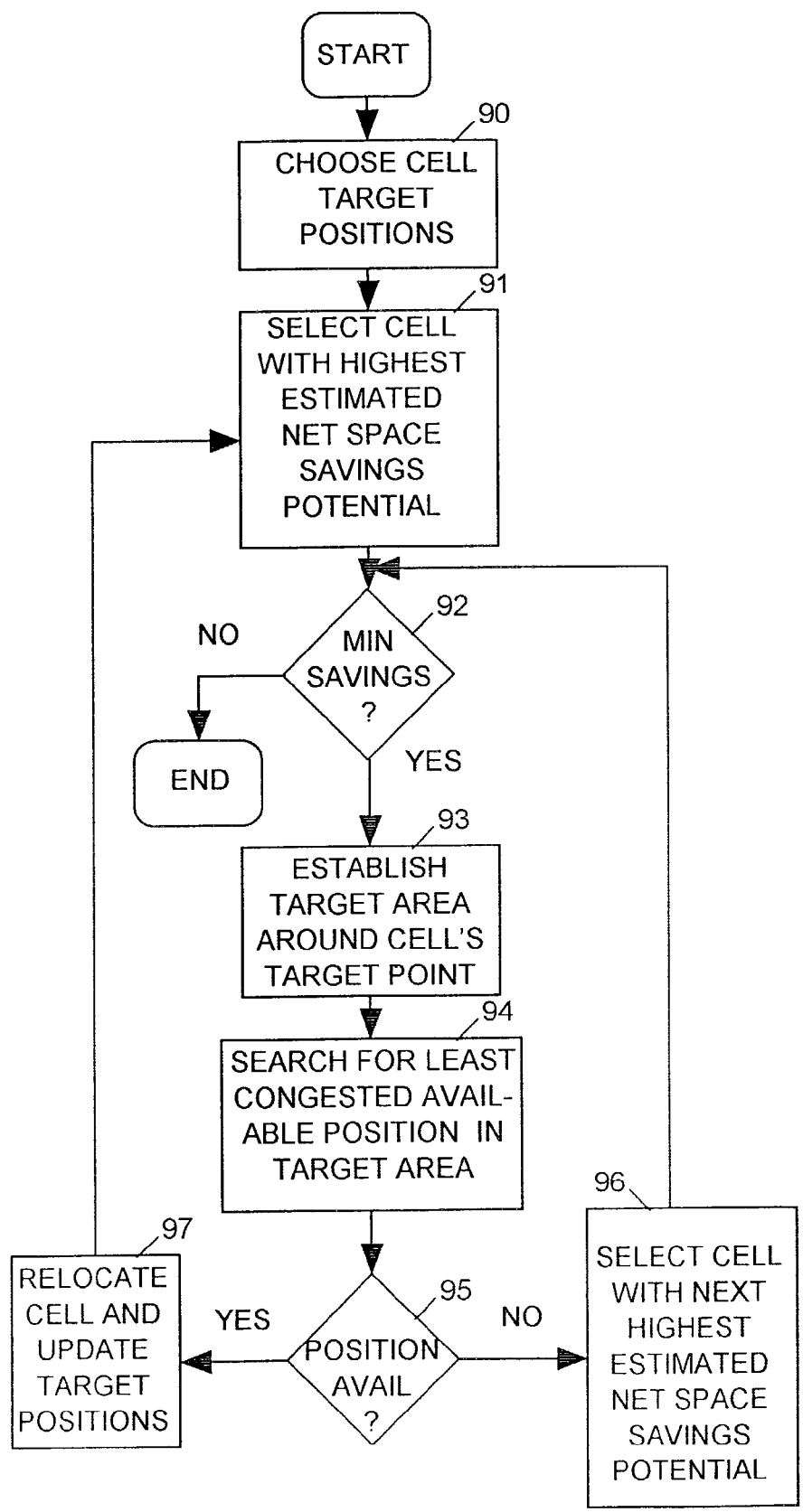
FIG. 9 is a flow chart illustrating a routing congestion reduction algorithm in accordance with the invention employed during the process illustrated in FIG. 8.

FIG. 9 illustrates a congestion reduction algorithm in accordance with the invention that may be employed at steps 74 and 78 of FIG. 8. The algorithm depicted in FIG. 9 reduces the likelihood of routing congestion by adjusting a trial or detailed placement plan to reposition selected cells to vacant positions within the layout selected such that the cell relocations substantially reduce the space occupied by nets. The algorithm takes effects on routing congestion into account when determining where to move each cell in that it is biased toward relocating cells to less routing congested areas of the layout.

Starting at step 90 (FIG. 9), a P&R tool implementing the congestion reduction algorithm selects a "target position" for each cell to which it may relocate the cell to provide a highest potential reduction in space occupied by the nets connected to that cell. One way to estimate the space occupied by the nets connected to a cell is to sum the total lengths of all branches of each net, since the area occupied by a net is proportional to the total length of all of its branches. In such case the estimated space savings achieved by relocating a cell is assumed to be proportional to the difference between the total length of all nets connected to the cell before and after the cell relocation. However when the trial routing plan indicates the widths of the various branches of the nets, and those widths vary, the P&R tool can directly calculate the total actual area occupied by the net and estimate space savings achieved by relocating a cell by finding the difference between the space occupied by the nets before and after the cell relocation.

Figure 10:
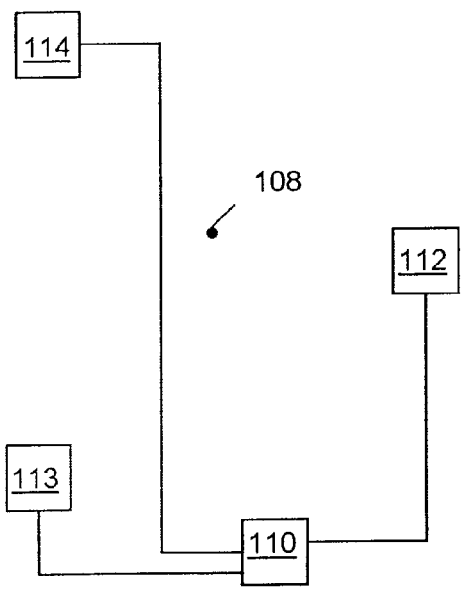
FIGS. 10–13 are simplified plan views of a portion of an IC layout graphically illustrating alternative approaches employed by the congestion reduction algorithm of FIG. 9 for calculating a target position for a cell.
Figure 11:
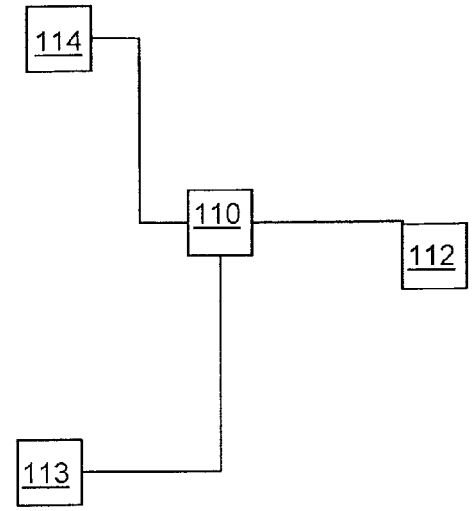

As there are many positions within a layout to which a cell may be relocated, investigating the effects of moving each cell to each such position in order to select a target position permitting maximum savings in space occupied by nets can be too time-consuming. However, a target position providing substantial savings can be located quickly. FIGS. 10 and 11 illustrate one relatively quick way to select a target position 108 for a cell 110 that is connected via three nets to seven other cells 112A, 112B, 113A, 113B, 113C, 114A and 114B. In this example, the target position 108 is computed as the centroid of the centroids of all cells to which cell 110 is connected. In a global placement plan, where the exact position and orientation of a cell within the partition to which its is assigned is unknown, the centroid of a cell is assumed to be the centroid of the partition to which it was assigned. Relocating cell 110 to target position 108 as shown in FIG. 10, normally reduces the total area occupied by the nets linking it to the other cells, though depending on how nets are routed, relocating cell 110 to a target position in this manner may not necessarily maximize the space savings. Nonetheless choosing the target position as the centroid of cell centroids is an acceptable approach.

Figure 12:
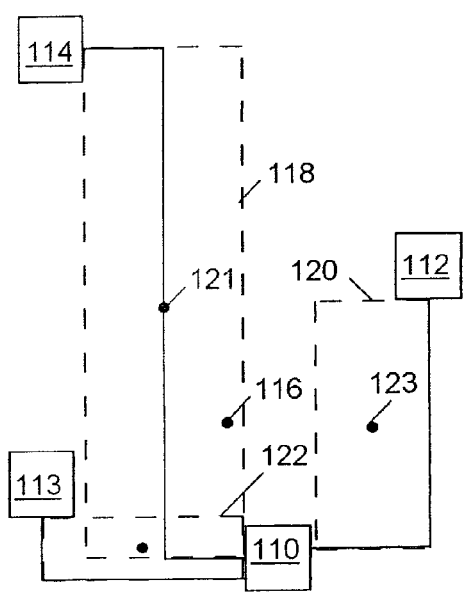
Figure 13:
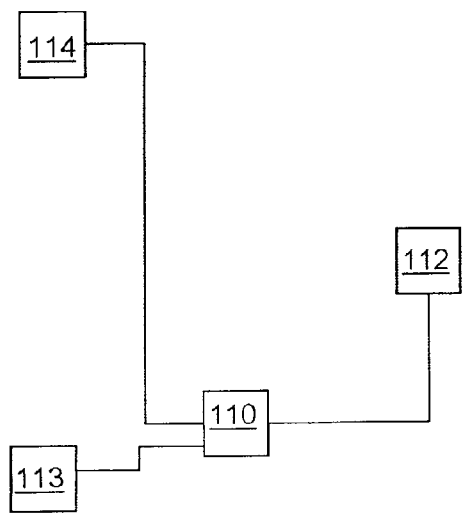

FIGS. 12 and 13 illustrate an alterative approach to establishing a target position 116 for cell 110 is selected as a "centroid of net centroids". In this approach, the P&R tool studies the trial routing plan to determine the smallest possible rectangle 118–120 fully containing all terminations of each net other than the termination on cell 110. The P&R tool then finds the centroid 121–123 of each rectangle and calculates the target position 116 for cell 110 as the centroid of net centroids 121–123. FIG. 12 illustrates results of relocating cell 110 to target position 116.

In this particular example, the two approaches provide substantially similar target positions 108 and 116, though in some cases the target positions produced by the two approaches may be farther apart, particularly if the number of cells connected to each net varies substantially. However either approach produces an acceptable target position.

Referring again to FIG. 9, having selected a target position for each cell at step 90, the P&R tool determines for each cell the potential savings in space occupied by the nets connected to that cell that may be achieved by relocating the cell to its target position, and then selects the particular cell having the highest potential net space saving based on an analysis of the routing plan (step 91). When the potential net space savings for the selected cell is above a predetermined minimum (step 92) the P&R tool establishes a "target area" surrounding the target position for which potential net space savings is above the predetermined minimum (step 93).

Figure 14:
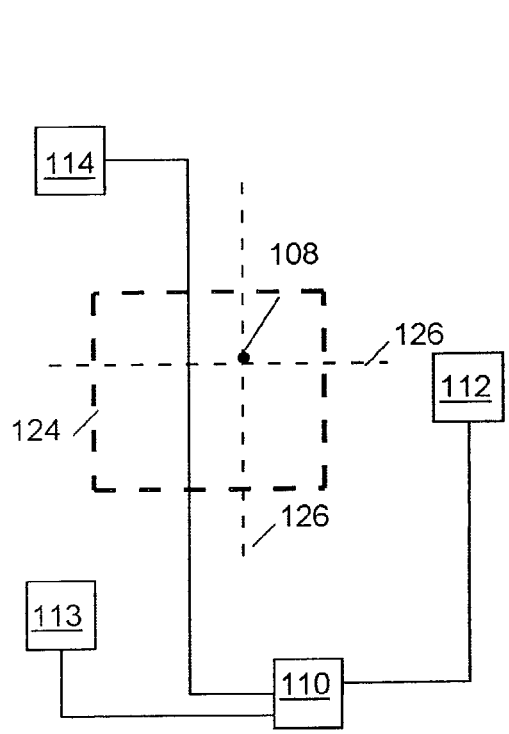
FIG. 14 is simplified a plan view of a portion of an IC layout illustrating how the congestion reduction algorithm of FIG. 9 determines a target area for a cell.

FIG. 14 illustrates such a target area 124 surrounding the target point 108 established using the centroid of cell centroids. The P&R tool may establish boundaries of target area 124, for example by calculating net space savings at points along lines extending horizontally and vertically from target point 108 using any appropriate conventional search technique.

After establishing a target area 124 for receiving cell 110, the P&R tool tries to find a vacant location within a least congested portion of the target area that can accept the cell (step 94). When it finds that such a position is available (step 95), it updates the placement and trial routing plans to indicate that the cell is moved to that position and updates the target position for each cell linked to the relocated cell to take into account its change in position (step 97) Thus in the example of FIG. 13, after moving cell 110 to the least congested portion of target area 124, the P&R tool modifies the target positions for cells 112–114 to modified.

Thereafter, at step 91, the P&R tool again selects the cell having highest net space savings potential and repeats steps 92–95 to determine whether and where to move that cell. Whenever at step 95, the algorithm determines that there is no vacant position in the target area of the selected cell, it refrains from relocating the cell. Instead, it selects the cell having the next highest potential net space savings (step 96) and then repeats steps 92–95 for that cell to determine whether it should move that cell. The P&R tool continues to relocate cells in this manner until it reaches a point at which the largest potential savings by relocating in cell is less than the minimum savings.

In the exemplary embodiment of the invention described above, the boundaries of the target area are established at step 93 such that moving the cell to any position within the target area is likely to result in at least a minimum reduction in the space occupied by the nets connected to the cell. The target area is then divided into blocks and the block to receive the cell is then selected at step 94 on the basis of two criteria. First it must at least appear to have sufficient spare capacity to receive the cell. Secondly, it must have the lowest routing density of all blocks having capacity to receive the cell.

Figure 15:
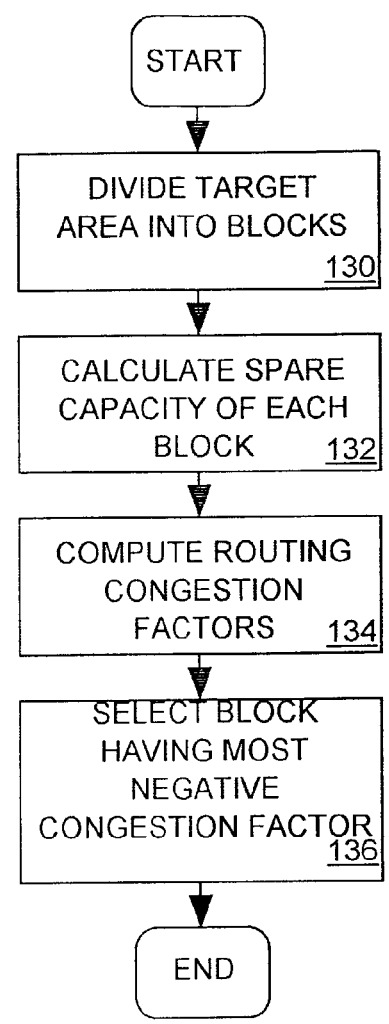
FIG. 15 depicts how the congestion reduction algorithm of FIG. 9 organizes the target area of FIG. 14 into an array of blocks when searching for vacant cell positions and determining routing densities within the target area.
Figure 16:
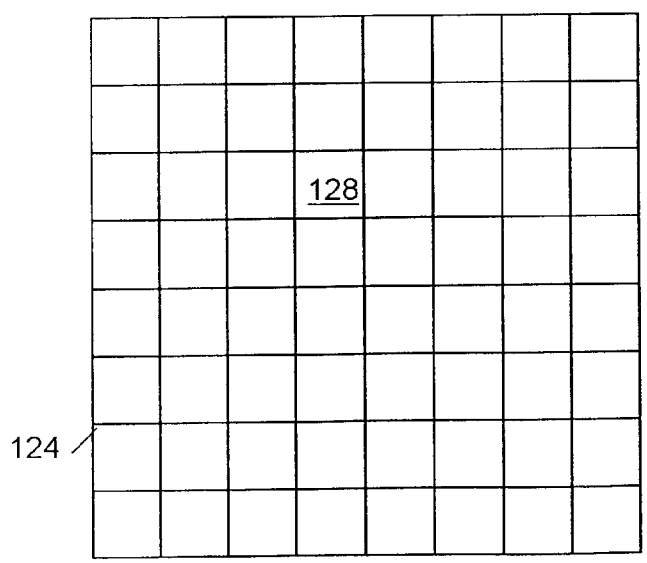
FIG. 16 is a schematic diagram illustrating a target area divided into a plurality of blocks in accordance with an exemplary embodiment of the present invention.

FIG. 15 illustrates a method for choosing at step 94 of FIG. 9 a least congested available position within a target area that is to receive a cell. The P&R tool first (step 130) divides the target area 124 into an array of blocks 128, each capable of storing several cells, as illustrated in FIG. 16. In this example target area 124 has been divided into an 8×8 array of blocks 128. The P&R tool then inspects each block 128 to determine whether it has sufficient spare capacity to receive cell 110 by subtracting the total area occupied by cells assigned to the block 128 from the product of a weighting factor and the total area of the block to determine the total vacant area (step 132). The P&R tool assumes that the block 128 can accommodate cell 110 when the area of cell 110 is less than the block's estimated total vacant area. The weighting factor may be chosen to be less than one to account for the fact that since cells may be of varying size and shape it may not be possible for a P&R tool to fully fill any block 128 when subsequently developing a detailed placement plan.

When more than one block 128 is identified at step 94 as having capacity to receive the cell to be relocated, the P&R tool selects the least congested block 128 having such spare capacity. To do so the P&R tool (step 134) first computes an overflow factor $F_{i,j}$ for each block $B_{i,j}$ having spare capacity as follows:

$$F_{i,j}=D_{i,j}-S_{i,j}$$

where $B_{i,j}$ is the block at the intersection of the fifth row and the column of the array, $S_{i,j}$ is the total available area within block $B_{i,j}$ for routing nets and demand $D_{i,j}$ the total amount of area demanded by the nets within the block. Nets are routed on various conductive layers formed above the surface of an IC's semiconductor substrate, so the routing resource supply S of each block is the total area of the routing layers within that block. The P&R tool computes the routing resource demand $D_{i,j}$ for each block as the sum of areas occupied by nets routed through the block in the trial routing plan. Where two conflicting nets overlap, the area in which the overlap is counted twice when computing demand $D_{i,j}$. The routing factor for a block 128 is positive when it is so congested that the demand for routing resources exceeds the supply. A block 128 having sufficient spare capacity to receive the cell and otherwise having the smallest (most negative) overflow factor $F_{i,j}$ is then selected to receive the cell (step 136).

Thus using the example technique illustrated by FIG. 15, when selecting a particular block 128 within the target area 124 to receive the cell, the P&R tool tries to minimize a "cost function" $C_{i,j}$ having only a single term F representing the spare routing capacity of the block:

$$C_{i,j}=F_{i,j}$$

However alternative embodiments of the invention may employ a more complex cost function for selecting a particular block within the target area to receive the cell. For example the cost function may be a weighted sum of terms reflecting such positive costs as increasing routing density in the target area, increasing cell density within the block, and reflecting negative costs (benefits) such as reducing the amount of space occupied by the nets linked to the cell.

Other costs (or benefits) of the relocation may also be incorporated into the cost function. For example, when timing analysis carried out at step (82 FIG. 8) determines that the path delays in certain net segments are too long, the P&R tool can identify those net segments as being "critical paths". Thereafter, when carrying out congestion reduction step 84, the cost function for selecting a block to receive a cell can include a term imposing a large cost to increasing the length of a critical path and providing a large benefit to decreasing the length of a critical path. Thus, for example, a cost function C might appear as follows:

$$C_{i,j}=W_1*F_{i,j}+W_2*CD_{i,j}-W_3*CPR_{i,j}-W_4*WLR_{i,j}$$

where $F_{i,j}$ is the overflow factor for block $B_{i,j}$ $CD_{i,j}$ represents a difference in cell units assigned to the block and cell unit capacity, $CPR_{i,j}$ represents total amount of critical path reduction caused by the relocation to block $B_{i,j}$ $WLR_{i,j}$ represents total estimated reduction in space occupied by nets caused by the relocation to block $B_{i,j}$ and $W_1-W_4$ are weighting factors. The weighting factors can be adjusted, for example to give more weight to keeping critical path short when signal path timing has become problematic or to give more weight to reducing routing density when routing congestion is particularly problematic. The block to receive the cell is that block for which the cost function C is a minimum.

The forgoing specification and the drawings depict exemplary embodiments of the best mode(s) of practicing the invention, and elements or steps of the depicted best mode(s) exemplify the elements or steps of the invention as recited in the appended claims. However the appended claims are intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

What is claimed is:

1. A method for eliminating routing congestion in an integrated circuit (IC) layout for an IC to be fabricated, wherein a placement plan specifies a position within the layout for each of a plurality of cells that are be included in the IC, and wherein the cells are to be interconnected by nets routed in accordance with a routing plan, the method comprising the steps of:

a. selecting one of the cells and a target position therefor;
   b. selecting a target area at a portion of the layout such that if the placement plan were to be revised to specify that the selected cell is to be positioned anywhere within the target area, the revision to the placement plan would reduce an amount of space within the layout that the routing plan must allocate to the nets to be connected to that cell, the target area being peripherally defined about the target position by a boundary selectively set for the selected cell;
   c. dividing the target area into an array of blocks delineated therein, wherein each block spans a separate portion of the target area, and wherein each block includes cell space for accommodating cells and routing space for accommodating nets;
   d. selecting one of the blocks having an estimated amount of unoccupied cell space sufficient to accommodate the selected cell; and
   e. revising the placement plan so that it specifies that the selected cell is to be positioned within the selected block.

2. The method in accordance with claim 1 wherein step a comprises the substeps of:

a1. identifying a separate target point within the layout for each cell that is distant from the position of the selected cell specified by the placement plan; and
   a2. choosing as the selected cell, the cell having a highest estimated amount of reduction in routing space that would be occupied by the nets connected to the cell if the cell were to be relocated to its target position.

3. The method in accordance with claim 2 wherein the target area for the selected cell surrounds the cell's target point.

4. The method in accordance with claim 2 wherein the target point for each cell is selected as a centroid of centroids of all other cells that are to be connected through nets to the cell.

5. The method in accordance with claim 2 wherein step d comprises the substeps of:
   d1. establishing a routing plan specifying routes of nets that are to interconnect the cells positioned in accordance with the placement plan; and
   d2. selecting the selected block from among the all blocks of the array, based on estimates of unoccupied cell space and unoccupied routing space within the block, the estimates being derived by analyzing the placement plan and the trial routing plan.

6. The method in accordance with claim 5 wherein the one block is chosen from among all blocks of the array as being the block having an estimated amount of unoccupied cell space sufficient to accommodate the selected cell as the selected block and also having a highest estimated amount of unoccupied routing space.

7. The method in accordance with claim 5 wherein the target point for each particular cell is selected as a centroid of centroids of a set of rectangular areas of the layout, wherein each rectangular area corresponds to a separate net connected to the particular cell and is of minimum dimensions needed to bound all terminations of the corresponding net on all cells other than the particular cell.

8. A method for generating a layout for an IC formed by cells interconnected by nets, the layout comprising a detailed placement plan specifying the position each cell is to occupy in the layout and a detailed routing plan specifying a route each net is to follow when interconnecting the cells, the method comprising the steps of:
   a. generating a global placement plan specifying an approximate position of each cell within the layout;
   b. generating a first trial routing plan specifying an approximate route each net is to follow within the layout;
   c. selecting each one of the cells referenced in the global placement plan and a target position therefor;
   d. selecting a first target area of the layout such that if the global placement plan were to be revised to specify that the selected cell is to be positioned anywhere with the first target area, such revision to the global placement plan would reduce an amount of space within the layout that must be allocated to the nets to be connected to the selected cell, the target area being peripherally defined about the target position by a boundary selectively set for the selected cell;
   e. organizing the target area into a first array of blocks, wherein each block of the first array spans a separate portion of the first target area, and wherein each block of the first array includes cell space for holding cells and routing for holding nets;
   f. selecting one of the blocks having an estimated amount of unoccupied cell space sufficient to hold the selected cell; and
   g. revising the global placement plan to produce a revised global placement plan specifying that the selected cell is to be positioned within the block selected at step f.

9. The method in accordance with claim 8 further comprising the steps of:
   h. processing the global placement plan revised at step g to produce a detailed placement plan specifying an exact position within the layout of each cell.

10. The method in accordance with claim 9 further comprising the steps of:
    i. generating a second trial routing plan specifying an approximate route each net is to follow within the layout to interconnect cells positioned as specified in the detailed placement plan;
    j. selecting one of the cells specified by the detailed placement plan;
    k. selecting a second target area of the layout such that if the detailed placement plan were to be revised to specify that the cell selected at step j is to be positioned anywhere within the second target area, such revision to the detailed placement plan would reduce an amount of routing space within the layout that would have to be allocated to the nets to be connected to the cell selected at step j;
    l. organizing the second target area into a second array of blocks, wherein each block of the second array spans a separate portion of the second target area, and wherein each block of the second array includes cell space for accommodating cells and routing space for accommodating nets;
    m. selecting one of the blocks of the second array having an estimated amount of unoccupied cell space sufficient to hold the cell selected at step j; and
    n. revising the detailed placement plan so that it specifies that the cell selected at step j is to be positioned within the block selected at step m.

11. The method in accordance with claim 10 further comprising the steps of:
    o. generating a detailed routing plan specifying an exact route of each net within the layout interconnecting cells positioned as specified by the detailed placement plan.

12. The method in accordance with claim 8 wherein step c comprises the substeps of:
    c1. identifying a separate target point within the layout for each cell that is distant from the position of the selected cell specified by the global placement plan; and
    c2. choosing as the cell selected at step c, the cell for having a highest estimated amount of reduction in routing space that would be occupied by the nets connected to the cell if the cell were to be relocated to its target position.

13. The method in accordance with claim 12 wherein the first target area for the cell selected at step c surrounds the cell's target point.

14. The method in accordance with claim 12 wherein the target point for each cell is selected as a centroid of centroids of all other cells that are to be connected through nets to the cell.

15. The method in accordance with claim 9 wherein selection of the block at step f is selected based on estimates of unoccupied cell space and unoccupied routing space within the block derived by analyzing the placement plan and the first trial routing plan.

16. The method in accordance with claim 15 wherein the block selected at step f is chosen from among all blocks of the array as being the block having an estimated amount of unoccupied cell space sufficient to accommodate the selected cell as the selected block and also having a highest estimated amount of unoccupied routing space.

17. The method in accordance with claim 15 wherein the target point for each particular cell is selected as a centroid of centroids of a set of rectangular areas of the layout, wherein each rectangular area corresponds to a separate net connected to the particular cell and is of minimum dimensions needed to bound all terminations of the corresponding net on all cells other than the particular cell.

18. Computer readable media containing software which when read and executed by a computer causes the computer to carry out a method for eliminating routing congestion in an integrated circuit (IC) layout for an IC to be fabricated, wherein a placement plan specifies a position within the layout for each of a plurality of cells that are to be included in the IC, and wherein the cells are to be interconnected by nets within the IC routed within the layout in accordance with a routing plan, wherein the method comprising the steps of:

a. selecting one of the cells and a target position therefor;
b. selecting a target area of the layout such that if the placement plan were to be revised to specify that the selected cell is to be positioned anywhere within the target area, the revision to the placement plan would reduce an amount of space within the layout that the routing plan must allocate to the nets to be connected to that cell, the target area being peripherally defined about the target position by a boundary selectively set for the selected cell;
c. organizing the target area into an array of blocks, wherein block spans a separate portion of the target area, and wherein each block includes cell space for accommodating cells and routing space for accommodating nets;
d. selecting one of the blocks having an estimated amount of unoccupied cell space sufficient to accommodate the selected cell; and
e. revising the placement plan so that it specifies that the selected cell is to be positioned within the selected block.

19. The computer readable media in accordance with claim 18 wherein step a comprises the substeps of:

a1. identifying a separate target point within the layout for each cell that is distant from the position of the selected cell specified by the placement plan; and
a2. choosing as the selected cell, the cell having a highest estimated amount of reduction in routing space that would be occupied by the nets connected to the cell if the cell were to be relocated to its target position.

20. The computer readable media in accordance with claim 19 wherein the target area for the selected cell surrounds the cell's target point.

21. The computer readable media in accordance with claim 19 wherein the target point for each cell is selected as a centroid of centroids of all other cells that are to be connected through nets to the cell.

22. The computer readable media in accordance with claim 19 wherein step d comprises the substeps of:

d1. establishing a routing plan specifying routes of nets that are to interconnect the cells positioned in accordance with the placement plan; and
d2. selecting the selected block from among the all blocks of the array, based on estimates of unoccupied cell space and unoccupied routing space within the block, the estimates being derived by analyzing the placement plan and the trial routing plan.

23. The computer readable media in accordance with claim 22 wherein the one block is chosen from among all blocks of the array as being the block having an estimated amount of unoccupied cell space sufficient to accommodate the selected cell as the selected block and also having a highest estimated amount of unoccupied routing space.

24. The method in accordance with claim 22 wherein the target point for each particular cell is selected as a centroid of centroids of a set of rectangular areas of the layout, wherein each rectangular area corresponds to a separate net connected to the particular cell and is of minimum dimensions needed to bound all terminations of the corresponding net on all cells other than the particular cell.

25. Computer readable media storing software which when read and executed by a computer causes the computer to cany out a method for generating a layout for an IC formed by cells interconnected by nets, the layout comprising a detailed placement plan specifying the position each cell is to occupy in the layout and a detailed routing plan specifying a route each net is to follow when interconnecting the cells, the method comprising the steps of:

a. generating a global placement plan specifying an approximate position of each cell within the layout;
b. generating a first trial routing plan specifying an approximate route each net is to follow within the layout;
c. selecting one of the cells referenced in the global placement plan and a target position therefor;
d. selecting a first target area of the layout such that if the global placement plan were to be revised to specify that the selected cell is to be positioned anywhere within the first target area, such revision to the global placement plan would reduce an amount of space within the layout that must be allocated to the nets to be connected to the selected cell, the first target area being peripherally defined about the target position by a boundary selectively set for the selected cell;
e. organizing the target area into a first array of blocks, wherein each block of the first array spans a separate portion of the first target area and wherein each block of the first array includes cell space for holding cells and routing space for holding nets;
f. selecting one of the blocks having an estimated amount of unoccupied cell space sufficient to hold the selected cell; and
g. revising the global placement plan to produce a revised global placement plan specifying that the selected cell is to be positioned within the block selected at step f.

26. The computer readable media in accordance with claim 25 wherein the method further comprises the steps of:

h. processing the global placement plan revised at step g to produce a detailed placement plan specifying an exact position within the layout of each cell.

27. The computer readable media in accordance with claim 26 wherein the method further comprises the steps of:

i. generating a second trial routing plan specifying an approximate route each net is to follow within the layout to interconnect cells positioned as specified in the detailed placement plan;
j. selecting one of the cells specified by the detailed placement plan;
k. selecting a second target area of the layout such that if the detailed placement plan were to be revised to specify that the cell selected at step j is to be positioned anywhere within the second target area, such revision to the detailed placement plan would reduce an amount of routing space within the layout that would have to be allocated to the nets to be connected to the cell selected at step j;
l. organizing the second target area into a second array of blocks, wherein each block of the second array spans a separate portion of the second target area, and wherein each block of the second array includes cell space for accommodating cells and routing space for accommodating nets;
m. selecting one of the blocks of the second array having an estimated amount of unoccupied cell space sufficient to hold the cell selected at step j; and
n. revising the detailed placement plan so that it specifies that the cell selected at step j is to be positioned within the block selected at step m.

28. The computer readable media in accordance with claim 27 wherein the method further comprises the steps of:
   o. generating a detailed routing plan specifying an exact route of each net within the layout interconnecting cells positioned as specified by the detailed placement plan.

29. The computer readable media in accordance with claim 25 wherein step c comprises the substeps of:
   c1. identifying a separate target point within the layout for each cell that is distant from the position of the selected cell specified by the global placement plan; and
   c2. choosing as the cell selected at step c, the cell for having a highest estimated amount of reduction in routing space that would be occupied by the nets connected to the cell if the cell were to be relocated to its target position.

30. The computer readable media in accordance with claim 29 wherein the first target area for the cell selected at step c surrounds the cell's target point.

31. The computer readable media in accordance with claim 29 wherein the target point for each cell is selected as a centroid of centroids of all other cells that are to be connected through nets to the cell.

32. The computer readable media in accordance with claim 25 wherein selection of the block at step f is selected based on estimates of unoccupied cell space and unoccupied routing space within the block derived by analyzing the placement plan and the first trial routing plan.

33. The computer readable media in accordance with claim 32 wherein the block selected at step f is chosen from among all blocks of the array as being the block having an estimated amount of unoccupied cell space sufficient to accommodate the selected cell as the selected block and also having a highest estimated amount of unoccupied routing space.

34. The method in accordance with claim 32 wherein the target point for each particular cell is selected as a centroid of centroids of a set of rectangular areas of the layout, wherein each rectangular area corresponds to a separate net connected to the particular cell and is of minimum dimensions needed to bound all terminations of the corresponding net on all cells other than the particular cell.

35. A method for eliminating routing congestion in an integrated circuit (IC) layout defined by a placement plan specifying a position within the layout of each cell forming the IC and routing plan describing routes followed by nets interconnecting the cells, the method comprising the steps of:
   a. estimating routing congestion in selected areas of the layout based on the routing plan, and selecting respective target positions for cells to be repositioned; and
   b. revising the placement plan to reposition cells to respective vacant areas within least routing congested ones of selected target areas of the layout for which cell relocation results in a reduction in the total lengths of the nets connected to the cell that exceeds a predetermined minimum reduction, whereby the revision would reduce an amount of space within the layout that the routing plan must allocate to the nets to be connected to the repositioned cells, the target areas each being peripherally defined about a corresponding one of the target positions by a boundary selectively set for the selected cell therefor.

36. Computer readable media containing software which when read and executed by a computer causes the computer to carry out a method for eliminating routing congestion in an integrated circuit (IC) layout defined by a placement plan specifying a position within the layout of each cell forming the IC and routing plan describing routes followed by nets interconnecting the cells, wherein method comprising the steps of:
   a. estimating routing congestion in selected areas of the layout based on the routing plan, and selecting respective target positions for cells to be repositioned; and
   b. revising the placement plan to reposition cells within least routing congested ones of selected target areas of the layout for which cell relocation results in a reduction in the total lengths of the nets connected to the cell that exceeds a predetermined minimum reduction. whereby the revision would reduce an amount of space within the layout that the routing plan must allocate to the nets to be connected to the repositioned cells, the target areas each being peripherally defined about a corresponding one of the target positions by a boundary selectively set for the selected cell therefore.

* * * * *